United States Patent Office 3,414,622
Patented Dec. 3, 1968

3,414,622
PRODUCTION OF HEXAMETHYLENEDIAMINE
William B. Hayes, Odessa, Tex., assignor to El Paso Products Company, Odessa, Tex., a corporation of Texas
No Drawing. Filed Oct. 26, 1965, Ser. No. 505,238
10 Claims. (Cl. 260—585)

ABSTRACT OF THE DISCLOSURE

Preparation of hexamethylenediamine, useful as an intermediate in the production of nylon which comprises the sequential steps of (1) oxy-dehydro-halogenating n-propane by reaction with a hydrogen halide and an oxygen-containing gas at a temperature of about 900° to 1100° F. in the presence of a ferric halide catalyst to produce an allyl halide; (2) condensing said allylic halide with propylene under pyrolysis conditions at a temperature of about 900° to 1100° F. for a time sufficient to effect substantial condensation thereof whereby said allyl halide and propylene are converted to 1,5-hexadiene; (3) hydrobrominating said 1,5-hexadiene by reaction with an excess of hydrogen bromide at a temperature of about −20° C. to 40° C. to obtain 1,6-dibromohexane; and (4) subjecting said 1,6-dibromohexane to ammonolysis by reaction with a molar excess of ammonia at a temperature of about 0° to 100° C. to obtain the corresponding alpha,omega-alkylenediamine.

This invention relates to the production of aliphatic diamines and more particularly to a new and improved process for the production of hexamethylenediamine according to a multi-step procedure well suited for industrial scale operations.

As is well known, the nylon industry has assumed a role of vast commercial importance due in large measure to the unique characteristics of polyamide-type resins which render them highly valuable for use in a wide variety of commercial applications. The ever-increasing demand for nylon-type products has correspondingly initiated wide-spread commercial demand for the provision of feasible processes for the production of nylon intermediates and especially the hexamethylenediamine intermediate. This latter material are of course, basic to the preparation of the several grades of nylon, and accordingly, a large measure of industrial research effort has been directed to improved processes for their synthesis economically.

However, the processes heretofore customarily employed for production of hexamethylenediamine have been uniformly characterized by disadvantages which detract considerably from their desirability for use in a commercial manner. By way of examples of the more significant disadvantages encountered with prior processes, there may be mentioned in particular, the relatively low yield of desired diamine product which in many cases has been intolerable, the strong tendency for formation of undesirable by-products, such as secondary and tertiary-amino compounds, the high cost of starting materials, catalysts process equipment, and the like. Moreover, disadvantages have been encountered because of the stringent process conditions required to be observed for efficacious implementation, the extended reaction times required, the difficulties associated with product recovery and purification, and the like. As a result, the desired amine product is invariably obtainable in but limited quantities and at relatively high costs.

For example many of the processes employed heretofore for hexamethylenediamine production have included, among others, as an essential manipulative step, the catalytic reduction of an olefin dinitrile to the corresponding diamine. Representative of the foregoing processes are those that involve seriatim, the formation of a dihaloalkadiene by dimerization of the correspondingly terminally unsaturated alkenyl halide, hydrogenation of the dihaloalkene to provide the dihaloalkane, and treatment of the dihaloalkane with a metal cyanide to form the dinitrile intermediate. The latter material is then catalytically reduced with hydrogen to produce the desired diamine. Significantly, processes of the foregoing type have been found to be subject to manifold disadvantages, such as those described hereinabove, including low product yield and by-product formation. Perhaps the paramount disadvantage, however, is one which inheres in the process itself by virtue of the fact that the additional steps of dinitrile formation and the reduction thereof are necessarily involved. The increased economic burden imposed thereby can, as will be readily apparent, be so prohibitive in some instances that successful maintenance of competitive commercial advantages is severely lessened and often lost completely.

In efforts to overcome or mitigate the foregoing and related disadvantages, previous investigators have resorted to various remedial techniques, such as improvements in the above described process, while others have turned to substantially different procedures. However, regardless of the particular refinements and/or alternative processes heretofore proposed, only limited commercial success has been thus far obtained with the result that considerable area for improvement yet remains.

Accordingly, one object of the present invention resides in the provision of a new and improved process for the preparation of hexamethylenediamine wherein the difficulties heretofore encountered are eliminated or otherwise mitigated to at least a substantial degree.

A further object of the present invention resides in the provision of a new and improved multistep synthesis for the formation of valuable hexamethylenediamine intermediates wherein excellent yields and conversions are obtained without the excessive formation of interfering side reactions so as to achieve an economically attractive integrated process.

The process of the instant invention affords several advantages not found in the prior art reactions enumerated hereinabove. The combination reaction of this invention provides an integrated system employing four simple process steps which do not require the use of expensive and cumbersome reaction equipment. Moreover, each of the steps provides a selective amount of the desired product in substantially pure form. Furthermore, the products formed in the reactions are easily susceptible of recovery and isolation for entry into the next step or recycle into the reaction system for continuous operation of the overall process.

Still other and related objects and advantages of the present invention will become apparent from the following description thereof.

The attainment of the foregoing and related objects is made possible in accordance with the present invention, which in its broader aspects includes the provision of a new and improved process for the production of hexamethylenediamine which comprises, sequentially;

(1) the oxy-dehydro-halogenation of n-propane with a hydrogen halide and an oxygen-containing gas to produce allyl halide;

(2) condensation of the allyl halide with an propylene to form diallyl;

(3) hydrobromination of the diallyl to prepare the corresponding 1,6-dibromohexane;

(4) ammonolysis of the dibromoalkane to yield the corresponding hexamethylenediamine dihydrobromide and subsequent treatment thereof with a base to provide hexamethylenediamine product.

In accordance with the discovery forming the basis of the present invention, it has been found that strict adherence to each of the foregoing steps in the chronological sequence specified makes possible the obtention of diamine product in yields heretofore unobtainable. While there is a tendency for the formation of by-products in the form of dimers and other higher molecular weight materials, the separation of these undesirable materials from the desired diamine by distillation or other means is much easier than with existing conventional processes. Additionally, a significantly outstanding advantage of the process of the invention resides in the utilization of mild reaction conditions which do not necessitate high pressure equipment (4,000 p.s.i. or higher) resulting in ease of separation of impurities thus reflecting a favorable cost picture as compared to other commercial processes. The commercial implications of this particular feature are of primary importance from an economic standpoint alone, not to mention the added savings attributable to the fact that the product amine is obtained in exceptionally high yield. However, it must be emphasized that the results provided by the present invention depend critically on the observance of each of the above-indicated steps, which will be described in considerable detail in the discussion which follows.

In order to clearly describe the process of the present invention, each of the unit reactions critical thereto will be separately described in the discussion which follows:

Oxy-dehydro-halogenation of propane to produce allyl halide

The initial step of the process is one of oxy-dehydro-halogenation performed on n-propane. The process of oxy-dehydro-halogenation results in the simultaneous dehydrogenation and halogenation of the propane to form allyl halide.

This step of the process is based on the unexpected discovery that, under the novel reaction conditions and catalyst employed, dehydrogenation as well as oxyhalogenation occurs to yield the allyl halide in good yield. In analogous reactions conducted herefore, only halogenation of the propane occurred by reason of the reaction of the oxygen with the hydrogen halide in the presence of a Deacon catalyst (e.g., $CuCl_2$) whereby elemental halogen is produced. Thus, the novel conditions and catalyst of the initial step of the invention permit the production of the desired allyl halide in a single step.

This step of the process is believed to proceed according to the following equation wherein X is a halogen atom;

(I) 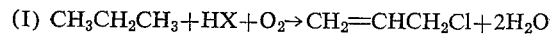
$CH_3CH_2CH_3 + HX + O_2 \rightarrow CH_2=CHCH_2Cl + 2H_2O$

The propane feed is initially reacted with an hydrogen halide and an oxygen-containing gas in a reactor maintained at a temperature of about 900° F. to 1100° F. and preferably about 1000° F. in the presence of a ferric chloride catalyst whereby the allylic halide is selectively formed.

The ratio of reactants employed in the oxy-dehydro-halogenation reaction is not necessarily a critical feature of the invention and may be varied from about stoichiometric amounts or proportions to an excess of one or more of the reactants depending upon the result thereof.

The hydrogen halide reactant may be any of the hydrogen halides including hydrogen chloride, hydrogen bromide, hydrogen iodide or hydrogen fluoride. The hydrogen halide is introduced as an anhydrous gas. Hydrogen chloride is the preferred reactant for this step of the process.

The oxygen reactant may be present as free or elemental oxygen or in admixture with inert diluents such as nitrogen. A particularly suitable form of the oxygen reactant comprises a stream of air as it is easily obtained and inexpensive. However, elemental oxygen is preferably employed.

A critical aspect of the initial step of the novel process of this invention resides the catalyst employed. It has been found that a catalyst system embodying a ferric halide (e.g., chloride, bromide, etc.) on a suitable support or carrier is selective in the oxy-dehydro-halogenation reaction toward the production of the desired allyl halide. The catalyst is preferably prepared by impregnating an inert material having considerable surface area with a solution of the ferric halide. Various well known carriers may be employed such as Alundum, silica gel, kieselguhr, pumice and the like. It is also within the scope of the invention, and representing a specific embodiment thereof, to employ metallic iron per se or other ferric salts, such as ferric sulfate as catalysts in the process. When employing this technique, the iron or ferric salts would be converted in situ to ferric chloride by action of the chlorine present.

Another critical aspect of the initial step of the multi-step process resides in the temperatures employed in the reaction. It is essential that the temperature in the reactor be maintained above about 900° F. for the selective character of the process to be achieved. A preferred temperature range is about 900° to 1100° F. with an especially preferred range of about 1000° F. to 1050° F. Temperatures lower than those specified result in the dominant formation of chlorinated hydrocarbons whereas higher temperatures result in extreme pyrolysis to produce cyclic products such as benzene.

The pressure employed in the reaction may range from at or near atmospheric to about 200 to 300 p.s.i.g. depending of course on the other reaction conditions. This is an especially attractive commercial feature of the process as it serves to decrease equipment size and lower operating costs.

In operation of this step of the process, the ferric chloride catalyst is charged to a reactor and the temperature elevated to that specified, viz., about 1000° F. Thereafter, the propane, hydrogen halide gas and oxygen are introduced into the reactor and conducted over the catalyst at about 900° F. to 1100° F. The reactants are maintained at the specified temperature range for a period sufficient for the reaction to go to completion and therefore contact periods will vary. However, it has been found that a residence time of about 0.1 to 50 seconds constitutes an adequate contact time with an especially preferred period of about 0.1 to 20 seconds.

The oxy-dehydro-halogenation step employing the ferric halide catalyst may be carried out by means of a fluidized bed, a moving bed reactor, a fixed bed reactor or an empty tube reactor as desired. A particularly suitable reactor is one employing the fluidized bed technique as the ferric halide catalyst is volatile at the process reaction temperatures. In this apparatus the feed gases are passed through a fluidized bed of the catalyst. In the course of the reaction, the ferric halide (e.g., $FeCl_3$) is removed from the bed and exits with the effluent gases. After leaving the reactor, the gases are first passed through a partial condenser where a water solution of the catalyst is recovered and subsequently sprayed back onto the hot support particles. The water quickly evaporates leaving a preponderance of the catalyst on the support.

A moving bed reactor may also be employed wherein the ferric halide particles are continuously circulated using an air-lift principle. At the top of the lift, after the lift air has been separated from the support particles, the recycle aqueous ferric halide is sprayed on the support. This method not only serves to keep the correct amount of ferric chloride in the reactor, but also can be used as an effective method of temperature control by merely adjusting the amount of recycle water.

The components may be premixed before they are added to the reaction zone or they may be added separately. To insure a thorough intimate mixing of the components however, it is generally desirable to premix prior to introduction into the reaction zone. It is also advantageous in most instances to preheat the components, either separately or in admixture to a temperature below the operating temperature before they are added to the reaction zone.

The products emitted from the reactor comprise allyl halide with minor amounts of other chlorinated products. The allyl halide may be recovered from the other products by any suitable means such as fractional distillation, extraction and the like.

The desired allyl halide recovered from the catalytic reactor is then passed, together with the 1-halopropane to the second reactor for the condensation reaction as delineated hereinafter. Any unreacted propane may be recovered and recycled to the initial step after separation from the recovered hydrogen halide.

The following examples illustrate the results obtained when proceeding according to the above-described method.

EXAMPLE I

The reactor employed in this experiment comprised a Vycor tube having a 19 mm. inside diameter and being 1030 mm. in length, with a 6 mm. outside diameter thermowell down the center. The empty volume of the reactor was packed with a catalyst consisting of ferric chloride impregnated on Alundum. The reactor was inserted into a cylindrical bronze aluminum block mounted inside an electrical heater.

The catalyst charged to the reactor was prepared by saturating Alundum with an aqueous solution of ferric chloride (9.1 weight percent $FeCl_3'6H_2O$), draining the excess liquid and drying the impregnated Alundum in an oven at 400° F.

N-propane at a rate of 0.75 gm. per minute, hydrogen chloride at a rate of 0.60 gm. per minute, oxygen at a rate of 0.25 gm. per minute were then passed through rotameters into the head of the reactor where they were mixed and then into the reactor proper. The temperature of the bronze-aluminum block was maintained at 1004° F. and the maximum temperature of the catalyst bed was 1071° F. at a bed depth of 15 inches. The residence time was 0.1 second.

Samples of the effluent gas were collected and analyzed by means of gas chromatography. It was found that about 54 percent of the propane was converted to products. Of the propane that was converted, 73 percent went to form propylene. This propylene is recycle and chlorinated to form additional amounts of allyl chloride by subsequent reaction. Of the propane converted on the initial pass, 11.5 percent went to form allyl chloride and 1.6 percent went to form 1,5-hexadiene. The propane starting material recovered is also recycled. The allyl chloride product and 1,5-hexadiene recovered are then passed to the condensation step.

EXAMPLE II

This example is the same as Example I except that ferric sulfate was employed as the catalyst rather than ferric chloride. The catalyst was prepared as in Example I. When this catalyst was employed in the reaction, the ferric sulfate was converted in situ to the chloride. The flow conditions and reactants were the same as in the previous example as was the reactor. In this example, the block temperature was 1005° F. and the maximum temperature of the catalyst bed was 1067° F. at a bed depth of 16.5 inches.

Analyses of the reactor effluent yielded the following results. Approximately 52% of the propane was converted to products. Of the starting material converted, 64% went to form propylene and 11.0% went to form allyl chloride. Of the HCl converted, 50% went to form allyl chloride.

The allyl chloride recovered from this step is then forwarded to the second or condensation step of the process.

Condensation of allyl halide with propylene to produce diallyl

The allyl halide employed in this step of the process refer to those compounds produced in the initial step described hereinabove. For purposes of illustration, and in conformance with the first step described hereinabove, the starting allylic halide will be allyl chloride.

A number of methods have been provided by which allyl halide compounds may be converted to diallyl or 1,5-hexadiene including, for example, simple dimerization of the allyl halide in the presence of silver or copper, the latter being provided in either supported or powdered form. Also dehydrohalogenation of the corresponding halogenated hydrocarbon has been attempted. However, the foregoing and related methods have proven unsatifactory, particularly for large scale operations, since the yields obtained are in many instances low and reactants are expensive.

In accordance with the present inventions and pursuant to the maximum attainment of the improvements thereof, it is required that conversion of the allyl halide to diallyl be effected via a pyrolysis technique. According to this step of the process, the allyl halide is heated above about 900° F. for a short period of time in the presence of an excess of propylene whereby the condensation proceeds to substantial completion. The desired diallyl may thereafter be readily recovered from the resulting mixture.

The relative proportions of the respective components should be such as to yield a mixture comprising the propylene in excess of the allyl halide and preferably in a molar excess of at least 3 to 1. Optimum results are achieved, for example, when employing the propylene and allyl halide in molar ratios varying from 12:1 to 1:1 and more preferably from 10:1 to 2:1. In general, higher ratios of the propylene gives higher yields of product.

The temperature employed for the pyrolysis reaction should in general range from about 850° F. to about 1100° F. With chloride, preferred temperatures generally range 900° F. to 1050° F. and more preferably from about 1000 ° F. to about 1050° F.

The pressure employed in the reaction zone may likewise vary over a wide range, i.e., from subatmospheric to super-atmospheric as desired. However, the most effective pressure found conducive for convenience of process operation with respect to recycling of unreacted starting materials has been found to be about 50 to 300 p.s.i.g.

The residence period required for substantial completion of the reaction will depend, inter alia, on the desired degree of conversion of the allyl halide, which in turn depends on the temperature and nature of the halide. For it has been found that the desired conversion per pass can be obtained in periods ranging from 0.1 to 50 seconds at temperature of about 900° F. to 1100° F. In general, the utilization of higher temperatures will result in decreased residence times.

The components may be premixed prior to entry into the pyrolysis zone or they may be added separately. In general, however, and to insure thorough mixing it is preferable to premix the components. It is also generally advantageous to preheat the components separately or in admixture, to a temperature below the operating temperature prior to entry into the reaction zone.

After reaction, the mixture withdrawn from the reaction zone is cooled, condensed and scrubbed or otherwise treated to remove the hydrogen chloride formed in the reaction. The diallyl may then be recovered by any suitable means such as fractional distillation, extraction, etc. Any allyl halide or propylene which are recovered may likewise be conveniently recovered by conventional means or recycled to the reaction zone.

The following examples illustrate in tabular form the results obtained when proceeding according to the above-described method. The pyrolysis reactor comprised a stainless steel tube inserted in an electrical heater having an inside diameter of one inch and having a one-fourth inch outside diameter thermowell inserted down the center thereof. The tube was forty-three inches long.

The procedure employed in carrying out the reaction was as follows: Allyl chloride was pumped and propylene was passed through a rotameter and the reactants were mixed in the head of the reactor for entry into the reaction tube. The off gases evolved were directed through a series of Dry-Ice-acetone traps maintained at about —78° C. Any gases not condensed at this temperature were passed through a wet test meter to obtain their volume samples of the off-gases were analyzed chromatagraphically and the contents of the cold traps were combined and analyzed.

The results obtained are itemized in Table I hereinbelow.

generated as the result of either a peroxide, hydroperoxide and/or a material which yields peroxides or hydroperoxides under the conditions of the reaction.

The free radical induced hydrobomination reaction employed in the method of the present invention is effectively carried out using any of the well known free-radical initiators. However, superior results are achieved when employing oxygen in uncombined form, i.e., air or oxygen, since each of these materials exhibits a ready tendency to form peroxides or hydroperoxides under the conditions employed in the reaction. It is to be noted however, that excellent results are also obtainable by the use of materials wherein the oxygen is present in combined form, i.e., peroxides and hydroperoxides. As examples of these latter materials there may be mentioned the dialkyl peroxides, the alkyl hydrogen peroxides, the diacyl peroxides and the like. Also inorganic peroxides may be employed to advantage in their free and salt form. Optimum results, however, have been realized by the generation of perox-

TABLE I.—CONDENSATION OF ALLYL CHLORIDE WITH PROPYLENE

| Ex. No. | Propylene, gms./min. | Allyl chloride, gms./min. | Reactor pressure, p.s.i.g. | Maximum Temperature, °F. | Conversion allyl chloride, percent | Selectivity [1] allyl chloride to 1,5-hexadiene, percent | Seectivity [2] allyl chloride to 1,5-hexadiene, percent |
|---|---|---|---|---|---|---|---|
| III | 9.6 | 2.9 | 55 | 1,024 | 4.5 | 50 | 73 |
| IV | 9.6 | 2.9 | 65 | 1,018 | 8.1 | 51 | 66 |
| V | 9.6 | 2.9 | 60 | 1,017 | 6.8 | 49 | 63 |
| VI | 4.8 | 2.8 | 90 | 920 | 6.5 | 50 | 51 |
| VII | 4.6 | 2.9 | 75 | 917 | 3.7 | 50 | 64 |
| VIII | 4.6 | 2.8 | 75 | 945 | 7.6 | 49 | 58 |
| IX | 9.6 | 2.9 | 75 | 1,023 | 14.9 | 46 | 43 |
| X | 9.6 | 2.9 | 90 | 997 | 10.0 | 53 | 56 |
| XI | 9.6 | 2.8 | 75 | 993 | 7.2 | 46 | 50 |
| XII | 4.8 | 1.4 | 75 | 995 | 32.0 | 44 | 39 |
| XIII | 9.6 | 2.8 | 55 | 1,020 | 7.8 | 46 | 46 |

[1] Selectivity based on material balance to determine allyl chloride disappearance.
[2] Selectivity based on HCl recovery to determine allyl chloride disappearance.

Hydromination of the diallyl

Hydromination of the diallyl obtained from step two is readily achieved by use of a low temperature directional addition of hydrogen bromide.

The procedure by which the HBr is added to the diallyl is accomplished in accordance with the present invention by the employment of reaction initiators comprising peroxides or hydroperoxides and/or materials which yield peroxides of hydroperoxides under the reaction conditions employed.

The hydrobromination reaction proceeds via "abnormal addition," i.e., in a manner contrary to that prescribed by the Markownikoff Rule. As is well known, the latter "Rule" sets forth the proposition that if an unsymmetrical hydrocarbon combines with a halogen acid, the halogen adds to the carbon atom having the fewer hydrogen atoms. A hydrocarbon is unsymmetrical within the meaning of the rule if the unsaturated linkage divides the compound into two dissimilar groups. Accordingly, "adnormal addition" is descriptive of the condition whereby hydrogen and halogen atoms are added in positions which are interchanged with respect to the mechanism of addition as prescribed by the Markownikoff Rule.

According to the present invention it has been found that if the hereindescribed reaction initiators are added to the 1,5-hexadiene produced in the condensation of step two and hydrogen bromide is added thereto under the reaction conditions set forth herein, "abnormal addition" of the HBr occurs selectively yielding 1,6-dibromohexane.

Without intending to be bound by any theory, it is postulated that the reaction mechanism involved in the hydrobromination reaction is free-radical in nature and can be described according to the following series of reactions:

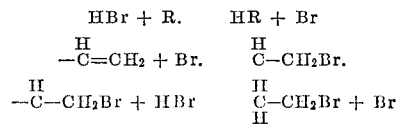

The R. in the first equation represents a free radical ides in situ by passage of uncombined oxygen through the 1,5-hexadiene during hydrobromination and this represents a preferred embodiment of this step of the inventive method.

The hydrobromination reaction is conducted by dissolving the free-radical generating compound in the 1,5-hexadiene in the liquid phase or bubbling an oxygen-containing gas therethrough. Thereafter the resultant mixture is contacted with gaseous hydrogen bromide employing the conditions set forth hereinafter.

The 1,5-hexadiene or diallyl recovered from the condensation step is purified and then hydrobrominated at near ambient temperatures. The reaction is conducted by introducing the free-radical generator into the diallyl and then adding the hydrogen bromide thereto.

The amount of free-radical initiator employed is not particularly critical, aside from the obvious requirement that it be sufficient to permit the desired reaction rate. This can readily be accomplished by the use of exceedingly small amounts and especially so when operating under the preferred conditions since the reaction, once initiated, is substantially self-sustaining. In general however, the amount of oxygen initiator employed should be such as to yield a peroxide or hydroperoxide concentration in the reaction mixture of about 2.0 mole percent. The initiator may be introduced into the liquid diallyl by any suitable method. However, it has been found that the gaseous oxygen-containing gas can be readily introduced into the diolefin by merely bubbling the same thereinto. This may be accomplished by use of a capillary tube for example.

The proportion of hydrogen bromide employed in the reaction should be maintained within the prescribed limits in order to assure the realization of advantageous results. In general, the hydrogen bromide should be employed in a stoichiometric excess of about 150 percent based on flow rate. This excess HBr corresponds to a range of about 1.5 to 3.5 parts HBr to 1 part diallyl by moles.

The temperatures employed in this step of the process are in the range of about —20° C. to 40° C. In general, it is considered preferable to employ reaction temperatures at or about embient temperature. A preferred reaction temperature for realization of advantageous results is about 30° C.

The pressure employed may range from subatmospheric to superatmospheric depending on the temperature employed. However, atmospheric pressures are employed in the preferred embodiment.

It has been found that improved conversion and selectively values are particularly manifest when the diallyl and initiator are premixed prior to introduction of the hydrogen bromide. Accordingly, this procedure also represents a preferred embodiment in carrying out the inventive process.

It is deemed essential that the hydrobromination reaction be conducted in an atmosphere free from moisture as the presence of the same has been found to be deleterious to formation of the desired products. To achieve the desired moisture absence, it may be necessary to initially dry the reaction zone as by heating and then maintaining an insert atmosphere therein such as by use of a stream of nitrogen or other conventional means.

The following example illustrates the results when proceeding according to the above described method.

EXAMPLE XIV

The reactor employed in this example comprised a coiled glass tube having an inside diameter of 6 mm. and a volume of 30 cc. The coil was enclosed in a glass jacket which served to control the reaction temperature by use of cooling water. The cooling water was maintained at about 30° C.

The 1,5-hexadiene was pumped at a rate of 0.244 gram moles per hour and admixed with 0.118 gram moles per hour of oxygen. This stream of diallyl and oxygen was then mixed with 0.608 gram moles per hour of gaseous hydrogen bromide and sent directly to the reactor.

At the conclusion of the reaction, the reactor effluent was trapped in an ice-cooled receiver and a sample thereof analyzed by gas chromatography. The analytical results are shown below in Table II.

TABLE II

| Produce | Wt. Percent | Efficiency, mole percent |
| --- | --- | --- |
| Light ends (L.E.) | 0.9 | 2.62 |
| 5-bromohexene-1 | 0.5 | 0.74 |
| 6-bromohexene-1 | 1.7 | 2.48 |
| Other dibromides | 0.1 | 0.10 |
| 2,5-dibromohexane | 0.8 | 0.80 |
| 1,4-dibromohexane | 2.3 | 2.24 |
| 1,5-dibromohexane | 5.6 | 5.49 |
| 1,6-dibromohexane | 85.6 | 83.71 |
| Heavier | 2.5 | 1.84 |
|  |  | 100.02 |

As may be observed from the above analyses, the hydrobromination reaction is decidedly selective toward anti-Markovnikoff addition to produce the 1,6-dibromohexane derivative in a predominant amount. Also it may be seen that the conversion to brominated compounds is nearly 100%. Separation of the dibrominated compounds is exceedingly difficult, but under the novel method of this invention it has been found to be unnecessary by resort to the final step of the invention, the amination reaction.

Ammonolysis of the 1,6-dibromohexane

The mixture of dibrominated compounds is next sent to the amination and final step of the process for reaction with ammonia under closely controlled conditions as described hereinafter It is well known that alkyl halides can be converted directly to their corresponding amine derivatives by treatment with ammonia. However, the methods heretofore provided for effecting such conversions have required the use of elevated temperatures on the order of 125° C. and often in excess of 200° C. These elevated temperature conditions have been found to result in commercially feasible reaction rates, product yield, etc. However, the products derived from these prior processes have generally been composed of a mixture of various mono- and polyamines and high molecular weight materials which are difficultly separable. It is necessary that resort be made to further treatment, e.g., fractional distillation, extraction and the like in order to eventually separate and isolate the desired product. Furthermore, the use of the elevated temperatures frequently give rise to excessive amounts of undesirable by-products.

Contrary to the prior processes described above, the amine-forming reaction contemplated for use herein is carried out under relatively mild temperature conditions employing specific proportions of the ammonia reactant. The reaction is also carried out under slight conditions of pressure.

The ammonolysis reaction is performed in the presence of an excess of anhydrous ammonia, the latter being employed in the liquid phase. The ammonia reactant is employed in a large excess of a mole ratio of about 50–300:1, a ratio which has been found to result in selective production of the desired diamino product. This result is somewhat surprising as it would ordinarily be expected that the ammonia and dibromo compound would react to form high molecular weight derivatives of the resinous variety. However, when operating under the conditions hereinafter specified, it has been found that any tendency for production of such products is substantially eliminated.

As pointed out hereinabove, the ammonolysis reaction has been found to result in higher selectivities of hexamethylenediamine when employing a large excess of the anhydrous ammonia. A particularly preferred ratio has been found to be about 50 to 300 moles of ammonia per mole of dibrominated hexane.

A truly advantageous feature of the present invention, and one on which novelty may be predicated, is that the mixture of dibrominated derivatives obtained from the previous step may be aminated without the intermediate isolation of the 1,6-dibromohexane. It has now been found that the mixture of dibrominated products may be subjected directly to amination with surprising results. This unexpected benefit is that amination, under the conditions specified herein, converts the dibromo compounds, other than the 1,6-dibromohexane, into hexamethyleneimine and other cyclic products which may be easily separated from the desired hexamethylenediamine. Ease of product separation at this stage of the process results in great economic benefits, particularly when operating on a large scale.

A further advantage of the instant step is that an acidic material, such as an ammonium halide, is not necessary to attain the objects of the invention. This is in contradistinction to prior processes wherein the presence of a material, such as ammonium chloride, was thought necessary to prevent excessive by-product formation.

The amination process of this invention is carried out under mild conditions of temperatures as specified hereinabove. The reaction temperature lies in the range of about 0° to 100° C., preferably about 10° to 50° C. An especially preferred reaction temperature is about 30° C.

At these temperatures, it has been found that the pressure of the reaction should be maintained at about 100 to 1000 p.s.i.g. depending on the temperature employed. A preferred pressure operation is about 100 to 500 p.s.i.g. with an especially preferred reaction pressure of about 200 p.s.i.g. Hence, another advantage of the process is realized by obviating the need for expensive high pressure operating equipment.

The reaction ordinarily requires from about ten minutes to about five hours to go to completion. However, the reaction is preferably conducted by mixing the reactants in a relatively short period, such as fifteen to twenty minutes and thereafter agitating until the reaction is compleed.

The reaction is conducted by charging the anhydrous liquid ammonia to a stirred autoclave and adding the 1,6-dibromohexane thereto over a short period. After completion of the reaction, and removal of the excess ammonia, the resulting aminated mixture is neutralized with a base to free the amine from its hydrogen bromide salt. Thereafter, the hydrocarbon component of the effluent is separated and sent to a convention distillation train for purification of the diamine. The excess ammonia is recycled in the continuous process and the metal bromide is recovered for processing.

The metal bromide recovered may be suitably processed to recover the bromine as hydrogen bromide. The HBr formed is thus suitably processed and recycled to the hydrobromination step.

The following example illustrates the application of the novel amination reaction of this invention as applied to the amination of 1,6-dibromohexane to produce hexamethylenediamine. However, the example is to be considered solely as illustrative of the invention and not limiting thereon.

EXAMPLE XV

The reactor employed in this example comprised a 1-liter stainless steel autoclave with agitation provided by a Magnedash stirrer.

19.4 gram moles of anhydrous liquid ammonia were charged to the autoclave and the stirring commenced. Then, 0.065 gram moles of 1,6-dibromohexane were added over a period of about 25 minutes. Thereafter, the reactor was stirred for four hours at a temperature of about 30° C. and a pressure of about 200 p.s.i.g. The material amounts added represent a ratio of 300 moles of ammonia to 1 mole of 1,6-dibromohexane.

At the conclusion on the reaction, the reactor contents were discharged into a flask containing 100 ml. of methanol and the free ammonia was allowed to weather off. The residue was then treated with 16 grams of NaOCH$_3$ dissolved in 60 ml. of methanol. This mixture was sampled and analyzed by means of gas chromatography and the results thereof are appended in Table III below.

TABLE III

| Product | 500 moles NH$_3$/mole 1, 8-dibromooctane | |
|---|---|---|
| | Wt., percent | Percent, efficiency |
| Hexamethyleneimine | 13.01 | 14.8 |
| Hexamethylenediamine | 82.70 | 80.5 |
| Other dimers | 1.52 | 1.69 |
| Cyclic dimers | 1.99 | 2.26 |
| Linear dimers | 0.78 | 0.79 |

The invention has been described with respect to certain preferred embodiments thereof, and there will become obvious to persons skilled in the art other variations, modifications and equivalents which are to be understood as coming within the scope of the present invention.

What is claimed is:

1. A process for the production of hexamethylenediamine which comprises the sequential steps of: (1) oxydehydrohalogenating n-propane by reaction with a hydrogen halide and an oxygen-containing gas at a temperature of about 900° to 1100° F. in the presence of a ferric halide catalyst to produce an allyl halide; (2) condensing said allyl halide with propylene under pyrolysis conditions at a temperature of about 850° to 1100° F. to produce 1,5-hexadiene; (3) hydrobrominating said 1,5-hexadiene derivative by reaction with an excess of hydrogen bromide in the presence of a peroxide or hydroperoxide free radical initiator at a temperature of −20° to 40° C. to obtain the 1,6-dibromohexane; and (4) subjecting said 1,6-dibromohexane to ammonolysis by reaction with a molar excess of anhydrous liquid ammonia at a temperature of about 10° to 50° C. and a pressure of 100 to 1000 p.s.i.g. and recovering the hexamethylenediamine produced.

2. A process according to claim 1 wherein the hydrogen halide reactant in step (1) is hydrogen chloride.

3. A process according to claim 2 wherein the ferric halide catalyst in step (1) is ferric chloride on a carrier.

4. A process according to claim 1 wherein condensation step (2) is conducted at a pressure of about 50 to 300 p.s.i.g.

5. A process according to claim 4 wherein the condensation reaction is conducted for a residence time of about 0.1 to 50 seconds.

6. A process according to claim 1 wherein hydrobromination step (3) is carried out empolying about a 150% stoichiometric excess of hydrogen bromide.

7. A process according to claim 6 wherein the peroxide or hydroperoxide free-radical initiator is selected from the group consisting of peroxides, hydroperoxides and substances which yield peroxide or hydroperoxides under the conditions of the reaction.

8. A process according to claim 7 wherein the 1,5-hexadiene and initiator are premixed prior to introduction of the hydrogen bromide.

9. A process according to claim 1 wherein the ammonolysis step (3) is conducted employing an excess of 50 to 300 moles of ammonia per mole of 1,6-dibromohexane.

10. A process according to claim 9 wherein the ammonolysis reaction is conducted at a temperature of about 30° C. and a pressure of about 200 p.s.i.g.

References Cited

UNITED STATES PATENTS 2,550,020  4/1951  Oxley et al.
3,052,735  9/1960  Hodgson et al. ____ 260—680 X
3,304,337  2/1967  Jordan et al. _____ 260—654 X

OTHER REFERENCES

Groggins: Unit Processes in Organic Synthesis, McGraw-Hill (New York) 1958, pp. 259 and 260.

CHARLES B. PARKER, Primary Examiner.

R. L. RAYMOND, Assistant Examiner.